United States Patent [19]
Hummel

[11] Patent Number: 5,538,173
[45] Date of Patent: Jul. 23, 1996

[54] EXPANDABLE TOOL FOR HOLDING ALIGNING PIPES TO BE WELDED

[76] Inventor: Jon C. Hummel, 210 W. Front St., Perrysburg, Ohio 43551

[21] Appl. No.: 370,807

[22] Filed: Jan. 10, 1995

[51] Int. Cl.$^6$ .................................................. B23K 37/053
[52] U.S. Cl. ........................ 228/44.5; 228/212; 219/61.1
[58] Field of Search .................................. 228/212, 213, 228/219, 44.5, 49.3; 219/61.1, 61.11, 61.7, 61.13; 269/48.1

[56] References Cited

U.S. PATENT DOCUMENTS

| | | | |
|---|---|---|---|
| 2,129,704 | 9/1938 | Meyer | 285/33 |
| 2,433,296 | 12/1947 | Schaefer | 228/44.5 |
| 2,777,048 | 1/1957 | Kocks | 228/44.5 |
| 2,917,114 | 12/1959 | Levendoski | 285/34 |
| 2,994,381 | 8/1961 | Brown | 285/34 |
| 3,255,822 | 6/1966 | Conrad | 285/34 |
| 3,439,940 | 4/1969 | Nunlist | 285/34 |
| 3,873,798 | 3/1975 | Friedman et al. | 228/29 |
| 3,916,282 | 10/1975 | Rothermel | 363/25 |
| 4,019,016 | 4/1977 | Friedman et al. | 228/27 |
| 4,301,355 | 11/1981 | Kimbrough et al. | 219/137 PS |
| 4,344,553 | 8/1982 | Lesher et al. | 219/60 A |
| 4,372,474 | 2/1983 | Taff | 228/29 |
| 4,386,726 | 6/1983 | Taff | 228/29 |
| 4,405,075 | 9/1983 | Roddy | 228/49.3 |
| 4,631,385 | 12/1986 | Rothermel | 219/137.71 |
| 4,776,507 | 10/1988 | Hoffmann | 228/49.3 |
| 4,780,594 | 10/1988 | Rothermel | 219/137.71 |
| 4,867,368 | 9/1989 | Tesch | 228/49.3 |
| 5,235,152 | 8/1993 | Jankus | 219/60 R |
| 5,398,862 | 3/1995 | Aleman | 228/44.5 |

FOREIGN PATENT DOCUMENTS 1191237  11/1988  U.S.S.R. .................................. 228/44.5

OTHER PUBLICATIONS

Tube–a–Liner™ . . . from Dearman!, Cogsdill Tool Products, Inc., Flyer No. D943A, no date.

Primary Examiner—Samuel M. Heinrich
Attorney, Agent, or Firm—Donald R. Fraser

[57] ABSTRACT

An expandable tool for holding and aligning pipes to be welded together is disclosed. The tool includes an annual array of radially movable gripping elements for engagement with the interior wall of the pipes to be welded. A wedge is mounted for axial movement relative to the gripping elements to effect selective radial outward movement of the gripping elements to align and hold the pipes for welding. The gripping elements are provided with passageways for delivery gas to preselected zones between the gripping elements and the interior wall surfaces of the pipes in the regions to be welded.

2 Claims, 2 Drawing Sheets

EXPANDABLE TOOL FOR HOLDING ALIGNING PIPES TO BE WELDED

BACKGROUND OF THE INVENTION

1. Brief Description of the Prior Art

Automatic welding systems for effecting an annular weld about the exterior or interior of pipes or tubes being butt welded together are known. Typically, such welding systems include means for effecting annular travel of the welding torch head about the exterior or interior of the junction of the pipes to be joined.

Amongst the systems which have been proven to obtain the above objectives are the systems illustrated and described in U.S. Pat. Nos. 3,873,798 to Friedman et al; 4,344,553 to Lesher et al; 4,372,474 to Taff; and 4,386,726 to Taff.

With the increased requirement for the use of stainless steel and high alloy pipes, tubes, and fittings, in the medical, pharmaceutical, food processing, beverage, and dairy fields, welding systems capable of providing an inert atmosphere or non oxidizing atmospheres adjacent the welding zone were required.

2. Summary of the Invention

With the aforementioned considerations, the present invention has as an object to produce an improved tool for aligning and holding two pipes in butting relationship preparatory to welding and providing an inert atmosphere adjacent the welding zone.

Another object of the invention is to produce an expandable tool for aligning and holding pipes during welding thereof.

Another object of the invention is to produce an expandable tool for aligning and holding pipes and providing an inert atmosphere adjacent the welding zone.

Another object of the invention is to produce an improved tool for aligning and holding pipes during the welding thereof and providing an inert gas environment adjacent the welding zone and militating against the escape of the gas from the zone.

Another object of the invention is to produce an improved tool for aligning and holding pipes during the welding thereof which is capable of introducing an inert gas to the welding zone to prevent the oxidation of elements such as chromium in the base material.

Another object of the invention is to produce an improved tool for aligning and holding pipes during the welding thereof and is capable of efficiently directing and concentrating inert gas adjacent the weld zone.

Still another object of the invention is to produce an improved tool for aligning and holding pipes during the welding thereof which is simple in structure and will reduce the normal setup and alignment time and increase the attendant production.

The above as well as other objectives of the invention are achieved by an expandable tool including an annular array of radially movable gripping members for engagement with and alignment of pipes to be welded wherein the gripping members cooperate to define a predetermined zone adjacent the inner surfaces of the ends of the pipes to be welded through appropriately formed passageways which establish communication with a source of inert gas and the predetermined zone adjacent the weld to be formed.

BRIEF DESCRIPTION OF THE DRAWINGS

The above objects and advantages of the invention will become readily apparent to one skilled in the art from reading the following detailed description of a preferred embodiment of the invention when considered in the light of the accompanying drawing, in which.

DETAILED DESCRIPTION OF THE PREFERRED EMBODIMENT

Figure 1:
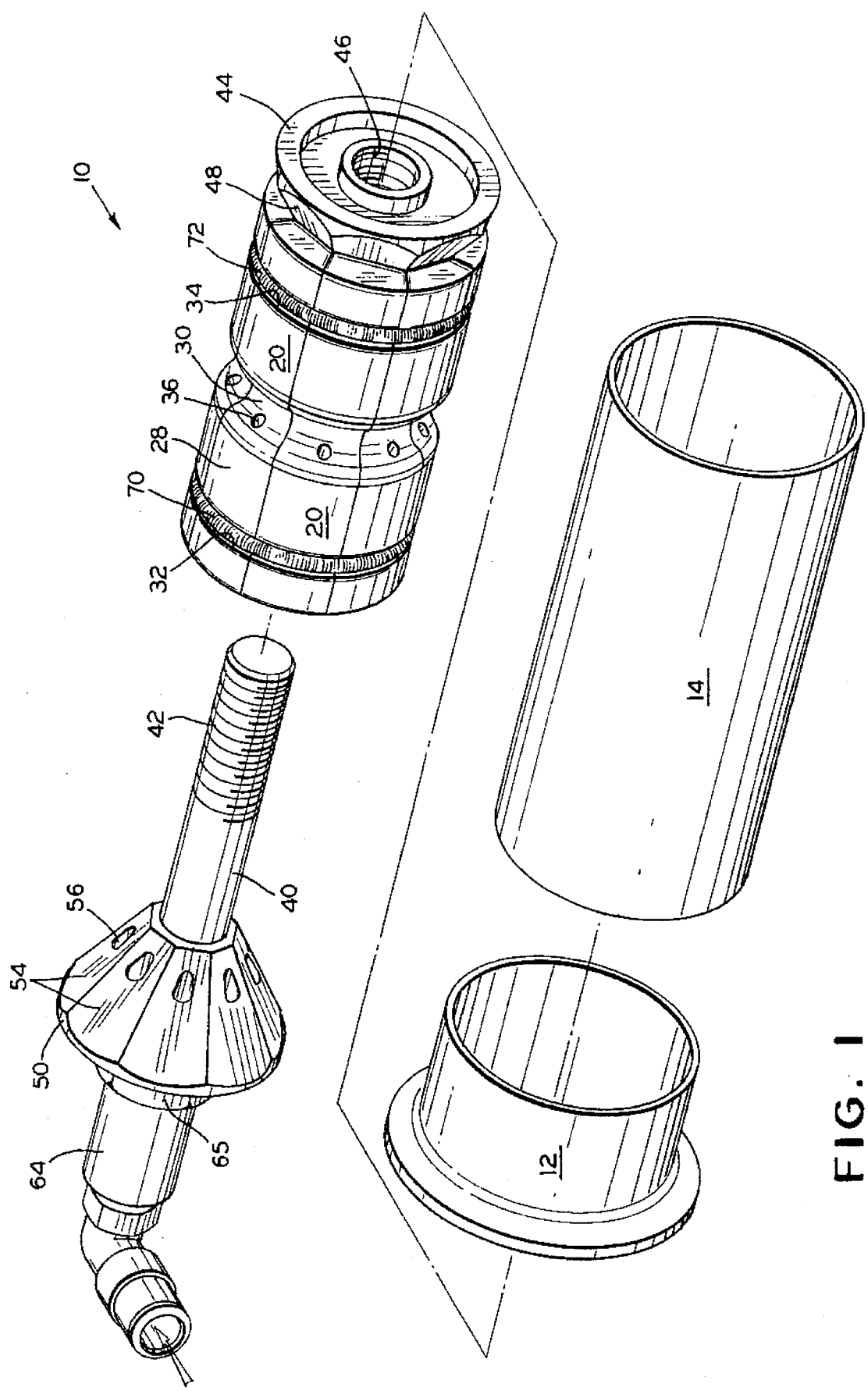
FIG. 1 is an exploded perspective view of a tool incorporating the features of the invention and associated pipes to be welded.
Figure 2:
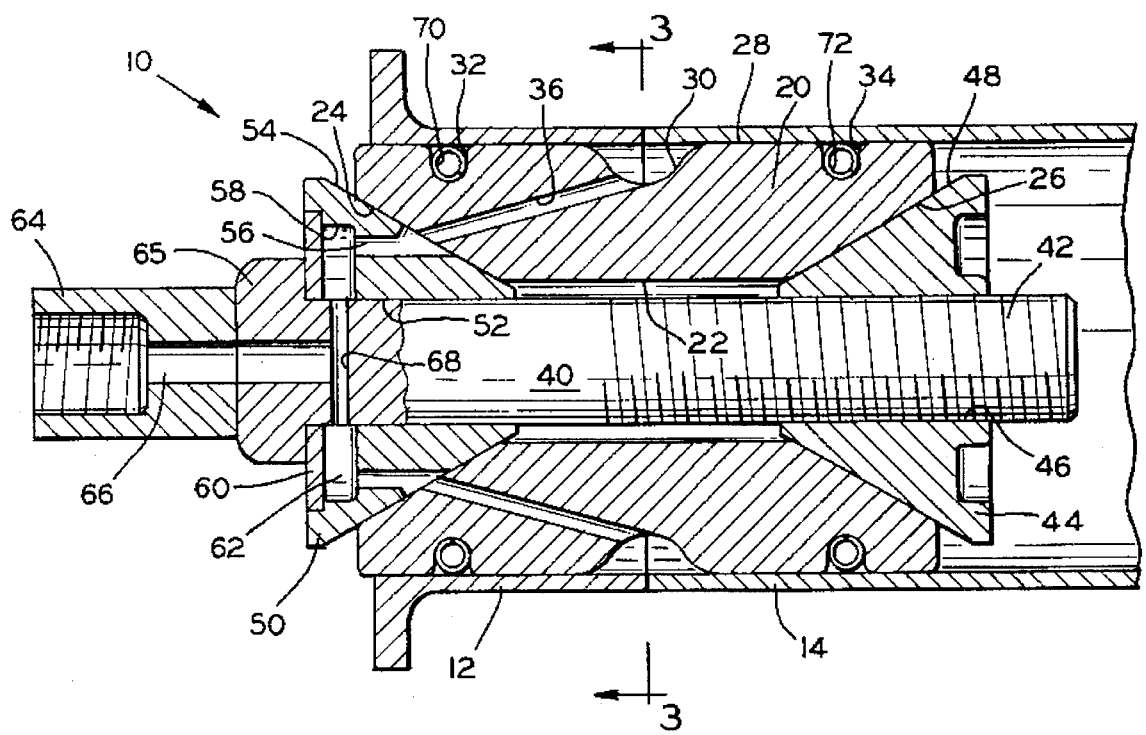
FIG. 2 is an enlarged fragmentary sectional view of the assembled form of the tool illustrated in FIG. 1 in an operative position within the interior of the pipes to be welded.
Figure 3:
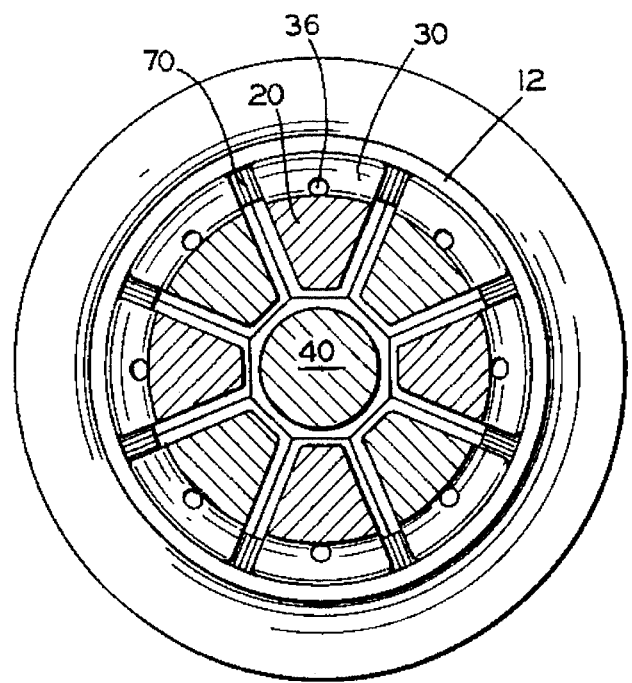
FIG. 3 is a sectional view of the apparatus illustrated in FIG. 2 taken along line 3—3 thereof.

Referring to the FIGS. 1, 2, and 3, there is shown a tool indicated generally by reference numeral 10 and pipes 12 and 14 to be aligned and held in position during a welding operation.

The tool 10 includes an array of gripping members 20. Each of the gripping members 20 is relatively elongate in form, and provided with an innermost surface 22 which terminates in opposing inclined surfaces 24 and 26. Each of the members 20 is also provided with an outermost surface 28 which is adapted to grippingly contact the inner surface of pipes to be welded together as will be discussed hereinafter.

The outermost surface 28 of the members 20 is formed with a central valley or groove 30 and spaced apart spring receiving grooves 32 and 34.

A gas passageway 36 is formed in each of the members 20 which is adapted to extend from the inclined surface 24 adjacent one end of the member 20 and terminate within the valley 30.

In cross-section, as illustrated in FIG. 3, each of the members 20 has truncated triangular shape wherein the outermost surface 28 is curved and forms the base of the truncated triangle. While the curvature of the outermost surface 28 is not deemed to be critical, it is believed that ideally the surface 28 should be formed on the same radius as the radius of the interior surface of the pipes witch which the tool is to be used. Also, the degree or amount of overall contact between the outer surface 28 and the inner surface of the associated pipes will be a function of the gas purging economy of the tool.

The tool 10 includes a centrally disposed elongate shaft 40, one end of which is provided with externally formed threads 42 adapted to threadably receive a conical wedge member 44 provided with an internally threaded bore 46. The outer surface of the wedge member 44 has a plurality of wedge shaped lands 48 which are adapted to extend nearly the full length of the member 44. The lands 48 are angularly disposed relative to the longitudinal axis of the shaft 40 substantially the reciprocal of the angle of the inclined surface 26 of the members 20.

A conical wedge member 50 is disposed at the opposite end of the shaft 40 and is provided with a central bore 52 of a slightly larger diameter than the outer diameter of the unthreaded portion of the shaft 40. Thus, the shaft 40 may rotate relative to the member 50. The outer surface of the wedge member 50 has a plurality of wedge shaped lands 54 which are adapted to extend nearly the full length of the member 50. The lands 54 are angularly disposed relative to the longitudinal axis of the shaft 40 substantially the reciprocal of the angle of the inclined surface 24 of the members 20.

The wedge member 50 is provided with a plurality of gas passageways 56 and an annular stepped recess 58. An annular cover 60 is adapted to fit within the stepped recess 58 to form a gas manifold.

The unthreaded portion of the shaft 40 terminates in a coupling 64 adapted to communicate with a remote source of purge gas. The coupling 64 is provided with a wrench receiving portion 65 which may be employed during the assembly of the tool 10 into and out of operative position. The purge gas communicates with the manifold 62 through a central bore 66 which terminates in radially outwardly extending passageways 68.

In the assembled form of the invention as illustrated in FIGS. 2 and 3, it will be noted that the gripping members 20 are disposed in an annular array about the center shaft 40. The inclined surfaces 24 and 26 of the members 20 are urged into contact with lands 48 and 54 of the spaced apart wedges 44 and 50, respectively, by tension springs, 70 and 72 disposed within the grooves 32 and 34, respectively.

In operation, the tool 10 is initially adjusted by suitable spacing of the wedge members 44 and 50 to cause the outermost surfaces 28 of the gripping members 20 to assume a configuration of size permitting insertion into the interior of pipes 12 and 14. The butting ends of the pipes 12 and 14 are positioned over the annular valley 30 formed in the outermost surfaces 28 of the annular array of assembled gripping members 20.

The shaft 40 is then rotated relative to the wedge member 44 causing the spacing between the wedge members 44 and 50 to decrease As the distance decreases, the interacting camming actions of lands 48 and 54 and the respective lands 26 and 24 of the gripping member 20 causes the outer surfaces 28 of the gripping members 20 to move radially outward into tight gripping relation with the interior surfaces of the pipes 12 and 14. Such action aligns the pipes 12 and 14 and holds them in butting relation preparatory to welding.

The next step in the sequence of operation involves the placement of suitable welding equipment adjacent the zone to be welded. It has been found that orbital welding machines can be satisfactorily employed.

At this point in the operation of the tool 10, a purging gas is introduced through the coupling 64, the bore 66, the passageways 68, manifold chamber 62, the passageways 56, 36, and finally into the zone defined by the valley or groove 30 and the facing interior surfaces of the butting ends of the pipes 12 and 14. The purging gas tends to migrate outwardly of the interior zone, thus providing an inert atmosphere suitable for welding stainless steel and other metals which require such inert atmosphere.

Upon completion of the formation of the weld, a wrench may be applied to the wrench receiving portion 65 of the coupling and is turned to cause the shaft 40 to rotate relative to the wedge member 44 causing the distance or spacing between the wedge member 44 and 50 to increase and thereby allowing the springs 70 and 72 to compress the gripping members 20 and release the tool 10 from the welded pipes 12 and 14. The tool 10 may then be removed.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. An expandable tool for aligning and holding pipes during the welding of the abutting ends of the pipes including:

an annular array of radially movable gripping members for engagement with and alignment of the pipes to be welded, said members cooperating to define a predetermined zone adjacent inner surfaces of the ends of the pipes to be welded, said members provided with passageways to establish communication between a source of gas and the predetermined zone; and means for selectively radially moving said gripping members, said means including at least a wedge shaped element provided with internal passageways alignable with the passageways in said gripping members.

2. An expandable tool for aligning and holding pipes during the welding of the abutting ends of the pipes including:

an annular array of radially movable gripping members for engagement with and alignment of the pipes to be welded, said members include a radially outwardly facing surface provided with groove means cooperating to define a predetermined zone adjacent inner surfaces of the ends of the pipes to be welded, said members provided with passageways terminating in said groove means to establish communication between a source of gas and the predetermined zone; and means for selectively radially moving said gripping members, said means includes at least one wedge member movable relative to said gripping members, and said wedge member including a passageway disposed between and communicating with the source of gas and the predetermined zone.

* * * * *